(12) United States Patent
Soriaga et al.

(10) Patent No.: US 11,329,780 B2
(45) Date of Patent: May 10, 2022

(54) PHYSICAL LAYER NON-LINE-OF-SIGHT (LOS) PATH DISCRIMINATION USING MULTIPLE FREQUENCY CARRIERS

(71) Applicant: QUALCOMM Incorporated, San Diego, CA (US)

(72) Inventors: Joseph Binamira Soriaga, San Diego, CA (US); Alexandros Manolakos, San Diego, CA (US); Naga Bhushan, San Diego, CA (US); Jay Kumar Sundararajan, San Diego, CA (US); Allen Minh-Triet Tran, Rancho Santa Fe, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 16/740,267

(22) Filed: Jan. 10, 2020

(65) Prior Publication Data
US 2020/0228272 A1 Jul. 16, 2020

(30) Foreign Application Priority Data
Jan. 16, 2019 (GR) .............................. 20190100032

(51) Int. Cl.
*H04W 4/00* (2018.01)
*H04L 5/00* (2006.01)
(Continued)

(52) U.S. Cl.
CPC ......... *H04L 5/0048* (2013.01); *H04B 17/318* (2015.01); *H04W 56/001* (2013.01)

(58) Field of Classification Search
CPC ... H04L 5/0048; H04W 56/001; H04B 17/318
See application file for complete search history.

(56) References Cited

U.S. PATENT DOCUMENTS 9,467,966 B2 * 10/2016 Burroughs ............ H04W 64/00
2013/0260820 A1 * 10/2013 Schmandt ............. H04W 76/28
455/553.1
(Continued)

OTHER PUBLICATIONS

Huawei, et al., "Details of NR Positioning Techniques", 3GPP Draft, 3GPP TSG RAN WG1 Meeting #94bis, R1-1810152, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051517567, 11 pages, Retrieved from the Internet: URL: http://www.3gpp.org/ftp/tsg%5Fran/WG1%5FRL1/TSGR1%5F94b/Docs/R1%2D1810152%2Ezip [retrieved on Sep. 29, 2018], Section 2.5, Section 2.6.
(Continued)

*Primary Examiner* — Maharishi V Khirodhar
(74) *Attorney, Agent, or Firm* — Thien T. Nguyen

(57) ABSTRACT

Disclosed are techniques for determining a line-of-sight (LOS) path between a transmitter and a wireless device. In an aspect, a wireless device receives a first reference signal on a first frequency band at a first time, receives a second reference signal on a second frequency band at a second time, compares the first time to the second time, and determines, at least based on the comparison of the first time to the second time, which of the first reference signal and/or the second reference signal followed the LOS path between the transmitter and the wireless device.

46 Claims, 8 Drawing Sheets

(51) Int. Cl.
  *H04B 17/318*  (2015.01)
  *H04W 56/00*  (2009.01)

(56) References Cited

U.S. PATENT DOCUMENTS

| | | | |
|---|---|---|---|
| 2015/0219750 A1* | 8/2015 | Xiao | G01S 5/0215 |
| | | | 342/451 |
| 2016/0124073 A1 | 5/2016 | Kwak et al. | |
| 2016/0205651 A1 | 7/2016 | Isa et al. | |
| 2017/0212208 A1* | 7/2017 | Baek | G01S 5/0252 |

OTHER PUBLICATIONS

Intel Corporation: "Potential RAT Dependent Techniques for NR Positioning", 3GPP Draft, 3GPP TSG RAN WG1 Meeting #95, R1-1812519, Intel—NR_POS_Techniques, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 12, 2016, Nov. 11, 2018 (Nov. 11, 2018), XP051554463, 16 pages, Retrieved from the Internet: URL: http://www.3gpp.org/ftp/Meetings%5F3GPP%5FSYNC/RAN1/Docs/R1%2D1812519%2Ezip [retrieved].
International Search Report and Written Opinion—PCT/US2020/013408—ISA/EPO—dated Apr. 28, 2020.

* cited by examiner

PHYSICAL LAYER NON-LINE-OF-SIGHT (LOS) PATH DISCRIMINATION USING MULTIPLE FREQUENCY CARRIERS

CROSS-REFERENCE TO RELATED APPLICATIONS

The present Application for Patent claims priority under 35 U.S.C. § 119 to Greek Patent Application No. 20190100032, entitled "PHYSICAL LAYER NON-LINE-OF-SIGHT PATH DISCRIMINATION USING MULTIPLE CARRIERS," filed Jan. 16, 2019, assigned to the assignee hereof, and expressly incorporated herein by reference in its entirety.

BACKGROUND OF THE DISCLOSURE

1. Field of the Disclosure

Aspects of the disclosure relate generally to telecommunications, and more particularly to physical layer non-line-of-sight (NLOS) path discrimination using multiple frequency carriers.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., Long-Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of determining a line-of-sight (LOS) path between a transmitter and a wireless device includes receiving, at the wireless device, a first reference signal on a first frequency band at a first time, receiving, at the wireless device, a second reference signal on a second frequency band at a second time, comparing, by the wireless device, the first time to the second time, and determining, by the wireless device, at least based on the comparison of the first time to the second time, which of the first reference signal and/or the second reference signal followed the LOS path between the transmitter and the wireless device.

In an aspect, a wireless device includes a memory, at least one transceiver, and at least one processor, wherein the at least one processor is further configured to receive, from a transmitter via the at least one transceiver, a first reference signal on a first frequency band at a first time, receive, from the transmitter via the at least one transceiver, a second reference signal on a second frequency band at a second time, compare the first time to the second time, and determine, at least based on the comparison of the first time to the second time, which of the first reference signal and/or the second reference signal followed an LOS path between the transmitter and the wireless device.

In an aspect, a wireless device includes means for receiving, from the transmitter, a first reference signal on a first frequency band at a first time, means for receiving, from the transmitter, a second reference signal on a second frequency band at a second time, means for comparing the first time to the second time, and means for determining, at least based on the comparison of the first time to the second time, which of the first reference signal and/or the second reference signal followed an LOS path between the transmitter and the wireless device.

In an aspect, a non-transitory computer-readable medium storing computer-executable instructions includes computer-executable instructions comprising at least one instruction instructing a wireless device to receive, from the transmitter, a first reference signal on a first frequency band at a first time, at least one instruction instructing the wireless device to receive, from the transmitter, a second reference signal on a second frequency band at a second time, at least one instruction instructing the wireless device to compare the first time to the second time, and at least one instruction instructing the wireless device to determine, at least based on the comparison of the first time to the second time, which of the first reference signal and/or the second reference signal followed a line of site (LOS) path between the transmitter and the wireless device.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
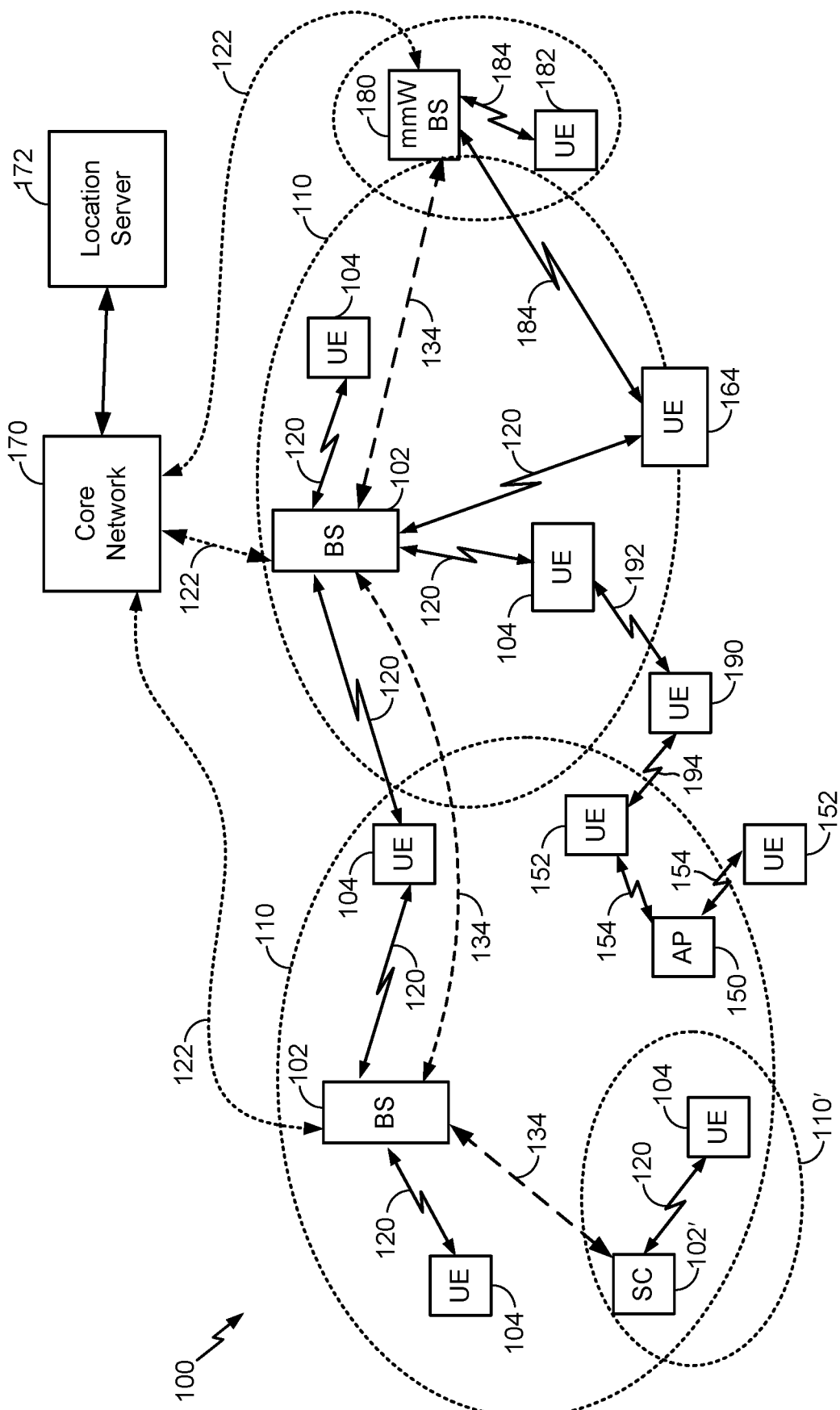
FIG. 1 illustrates an exemplary wireless communications system, according to various aspects.

Elements, stages, steps, and/or actions with the same reference label in different drawings may correspond to one another (e.g., may be similar or identical to one another). Further, some elements in the various drawings may be labelled using a numeric prefix followed by an alphabetic or numeric suffix. Elements with the same numeric prefix but different suffixes may be different instances of the same type of element. The numeric prefix without any suffix is used herein to reference any element with this numeric prefix.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
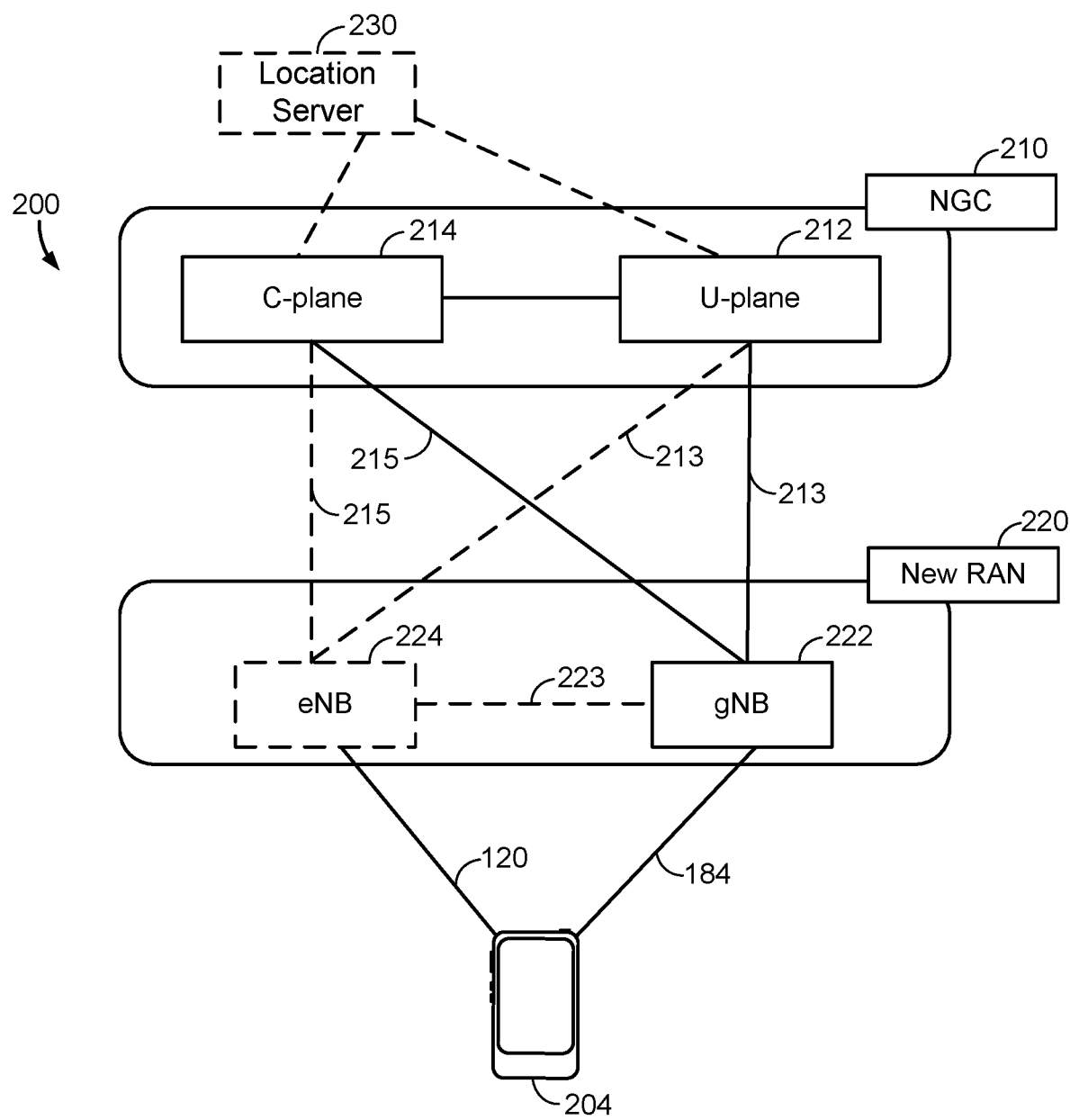
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
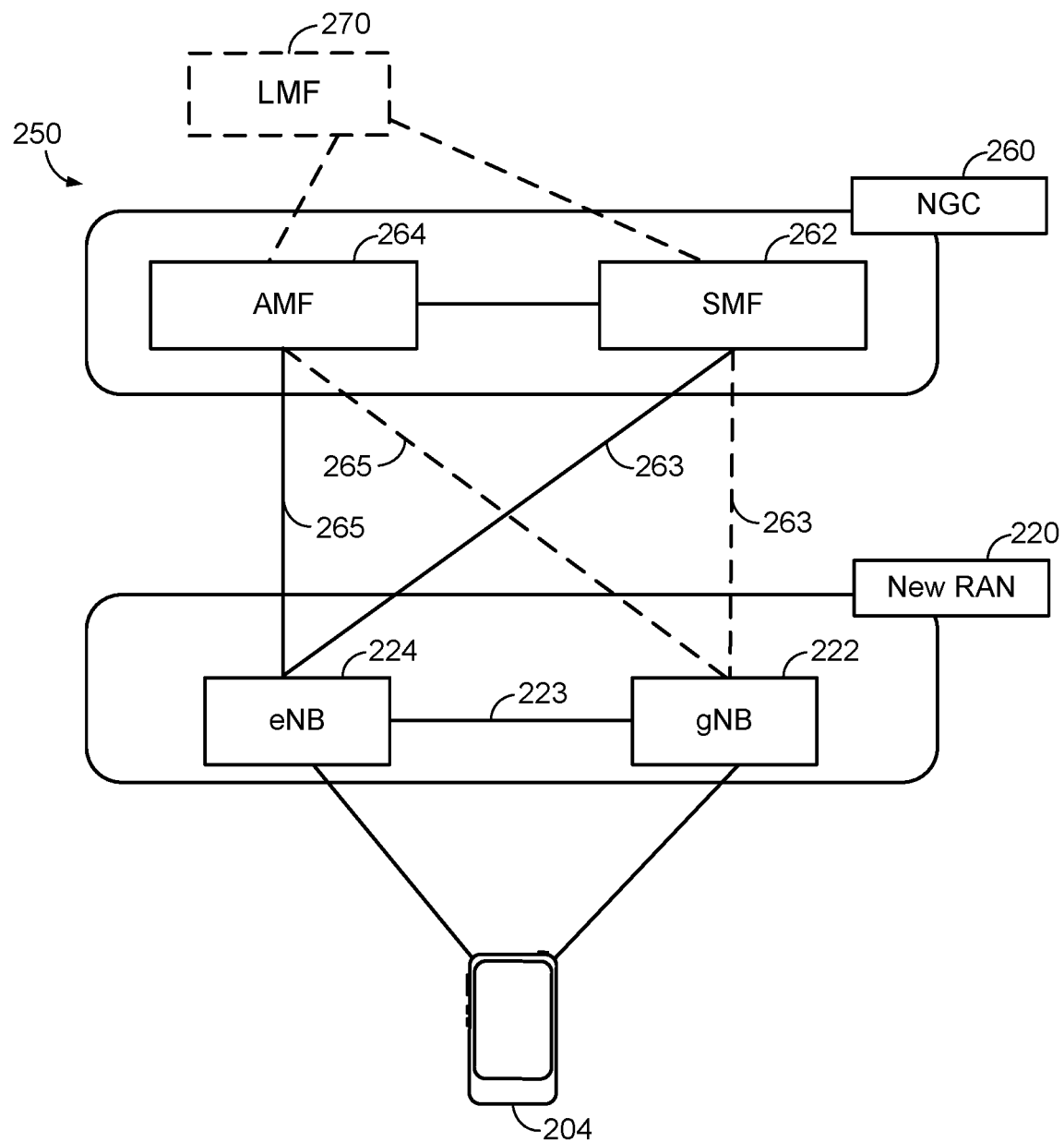

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
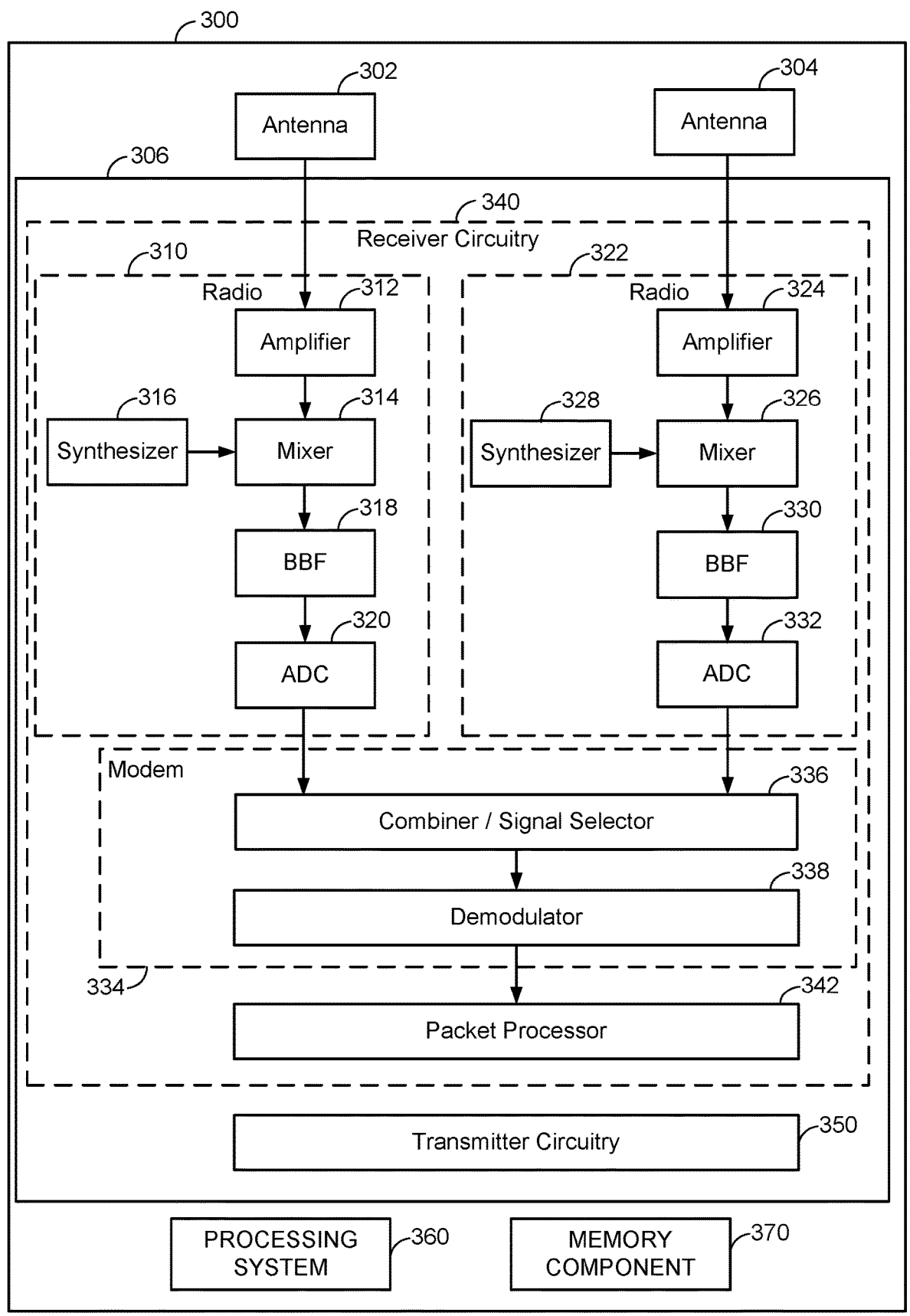
FIG. 3 is a block diagram illustrating an exemplary UE, according to various aspects.

FIG. 3 illustrates an exemplary architecture of a wireless device 300 having a transceiver 306 capable of implementing carrier aggregation, according to aspects of the disclosure. The wireless device may be a UE, such as UE 204, or a base station, such as any of the base stations described herein. The transceiver 306 may be coupled to first and second antennas 302 and 304.

The transceiver 306 includes receiver circuitry 340 and transmitter circuitry 350. The receiver circuitry 340 is capable of implementing carrier aggregation. As such, in the example of FIG. 3, the receiver circuitry 340 includes two radios 310 and 322 coupled to the two antennas 302 and 304, respectively. Note that although FIG. 3 illustrates only two antennas 302 and 304 and two radios 310 and 322, as will be appreciated, there may be more than two antennas and two radios. The transmitter circuitry 350 may also be capable of implementing carrier aggregation similarly to the receiver circuitry 340, but this is not shown in FIG. 3 for the sake of simplicity.

A transceiver (e.g., transceiver 306) generally includes a modem (e.g., modem 334) and a radio (e.g., radio 310 or 322). The radio, broadly speaking, handles selection and conversion of the RF signals into the baseband or intermediate frequency and converts the RF signals to the digital domain. The modem is the remainder of the transceiver.

Referring to FIG. 3, radio 310 includes an amplifier 312, a mixer 314 (also referred to as a signal multiplier) for signal down conversion, a frequency synthesizer 316 (also referred to as an oscillator) that provides signals to the mixer 314, a baseband filter (BBF) 318, and an analog-to-digital converter (ADC) 320. Similarly, radio 322 includes an amplifier 324, a mixer 326, a frequency synthesizer 328, a BBF 330, and an ADC 332. The ADCs 320 and 332 are coupled to the signal combiner/signal selector 336 of the modem 334, which is coupled to the demodulator 338 of the modem 334. The demodulator 338 is coupled to a packet processor 342. The demodulator 338 and the packet processor 342 provide demodulated and processed single or multiple output signals to the communication controller and/or processing system 360.

Note that not every component illustrated in FIG. 3 is required for the operation of the system. For example, in direct RF to baseband conversion receivers, or any other direct conversion receivers, including certain software defined radio (SDR) implementations, various components of the receiver circuitry 340 are not necessary, as is known in the art. In addition, while FIG. 3 illustrates a single modem 334 coupled to two radios 310 and 322, as will be appreciated, each radio 310 and 322 may be coupled to a different modem, and the receiver circuitry 340 would therefore include the same number of radios and modems.

As noted above, carrier aggregation is a technique whereby a wireless device (e.g., wireless device 300) can receive and/or transmit on multiple carrier frequencies at the same time, thereby increasing downlink and uplink data rates. Thus, the wireless device 300 may simultaneously utilize radio 310 to tune to one carrier frequency (e.g., the anchor carrier) and radio 322 to tune to a different carrier frequency (e.g., a secondary carrier). In addition, each radio 310 and 322 may be tunable to a plurality of different frequencies, one at a time. The frequencies may be in different frequency "bands," such as frequencies in FR1, which include sub-6 GHz frequency bands, and/or FR2, which include frequency bands in the mmWave range (e.g., 30 to 300 GHz).

The wireless device 300 further includes a processing system 360 that may direct operations of its respective systems. Additionally, a memory component 370 can provide storage for program codes and data used by the processing system 360 and/or the transceiver 306. For example, the memory component 370 may include instructions that, when executed by the processing system 360 and/or transceiver 306, cause the wireless device 300 to perform the operations described herein. In an aspect, the processing system 360 may be an ASIC, or other processor, microprocessor, logic circuit, or other data processing device. In an aspect, the memory component 370 may be random access memory (RAM), flash memory, read-only memory (ROM), erasable programmable ROM (EPROM), electrically erasable programmable ROM (EEPROM), registers, hard disk, a removable disk, or any other form of storage medium known in the art.

Figure 4:
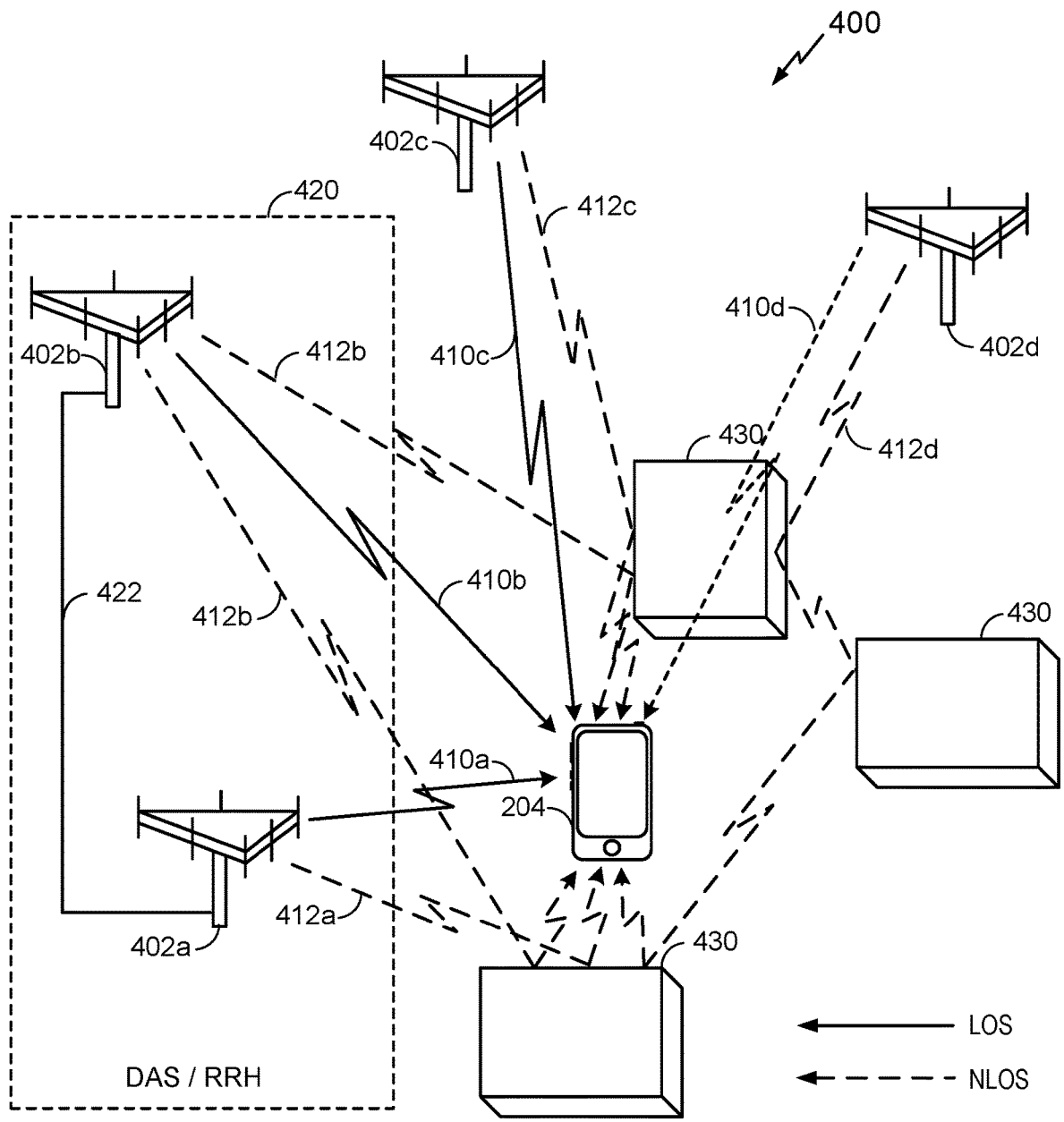
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 204 is attempting to calculate an estimate of its position, or assist another entity (e.g., a base station or core network component, another UE, a location server, a third party application, etc.) to calculate an estimate of its position. The UE 204 may communicate wirelessly with a plurality of base stations 402a-d (collectively, base stations 402), which may correspond to any combination of base stations 102 and 180 and/or WLAN AP 150 in FIG. 1, using RF signals and standardized protocols for the modulation of the RF signals and the exchange of information packets. Note that while FIG. 4 illustrates one UE 204 and four base stations 402, as will be appreciated, there may be more UEs 204 and more or fewer base stations 402.

FIG. 4 further illustrates an aspect in which base stations 402a and 402b form a DAS/RRH 420. For example, the base station 402a may be the serving base station of the UE 204 and the base station 402b may be a neighbor base station of the UE 204. As such, the base station 402b may be the RRH of the base station 402a. The base stations 402a and 402b may communicate with each other over a wired or wireless link 422.

To support position estimates, the base stations 402 may be configured to broadcast reference RF signals (e.g., positioning reference signals (PRS), navigation reference signals (NRS), tracking reference signals (TRS), cell-specific reference signals (CRS), channel state information reference signals (CSI-RS), demodulation reference signals (DMRS), synchronization signals, etc.) to UEs 204 in their coverage area to enable a UE 204 to measure reference RF signal timing differences (e.g., observed time difference of arrival (OTDOA) or reference signal time difference (RSTD)) between pairs of network nodes and/or to identify the line of sight (LOS) or shortest radio path between the UE 204 and the transmitting base stations 402. Identifying the LOS/shortest path is of interest not only because that path can subsequently be used for OTDOA measurements between a pair of base stations 402, but also because identifying the shortest path can directly provide some positioning information based on the direction of the path. Moreover, identification of the shortest path can be used for other position estimation methods that require precise ToA estimation, such as round-trip-time (RTT)-based methods.

As noted above, 5G supports operation at very high and even extremely-high frequency (EHF) bands, such as mmW frequency bands. One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz or 5 GHz bands.

Propagation loss is also an issue in MIMO and massive MIMO systems in any band. The term MIMO as used herein generally refers to both MIMO and massive MIMO. MIMO is a method for multiplying the capacity of a radio link by using multiple transmit and receive antennas to exploit multipath propagation. Multipath propagation occurs because RF signals not only travel by the shortest path between the transmitter and receiver, which may be a LOS path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To accurately determine the position of a UE 204 using the RTT procedures described above with reference to FIGS. 5-6B, the UE 204 needs to measure the reference RF signals received over the LOS path (or the shortest NLOS path where an LOS path is not available), between the UE 204 and a network node (e.g., a base station 402, an antenna or antenna array of a base station 402). However, as discussed above, RF signals travel not only by the LOS/shortest path between the transmitter and receiver, but also over a number of other paths (multipaths) as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 704.

Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over an LOS path 410d and an NLOS path 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" or "shortest path" between a transmitter and receiver refers to the straight line path from the transmitter to the receiver. However, such a path may not be an actual LOS path (due to blockages). In that case, the next available path is an NLOS path, which reflects off of some surface(s) when travelling from the transmitter to the receiver.

A major bottleneck in determining the ToA measurements for the LOS path is separating the measurement of the LOS path from measurements of the NLOS paths. It has been observed that distinctly different frequency bands have different propagation (and reflection) characteristics. For example, lower frequency bands (e.g., sub-6 Ghz) penetrate concrete and glass, while higher frequency bands (e.g., mmWave) reflect off of such surfaces. However, all frequency bands travel at the speed-of-light. Thus, the propagation delay for the LOS path is the same across every frequency band.

For example, referring back to FIG. 4, assume that base station 402d transmits a first reference signal on a high frequency band (e.g., a mmWave frequency band) and a second reference signal on a low frequency band (e.g., a sub-6 GHz frequency band). The first reference signal, carried on the high frequency band, follows a NLOS path 412d, reflecting off of multiple objects 430, while the second reference signal, carried on the low frequency band, follows a LOS path 410d though an object 430. As such, the second reference signal will arrive at the UE 204 before the first reference signal, having followed the LOS path from the base station 402d to the UE 204.

As another example, assume that base station 402c also transmits a first reference signal on a high frequency band (e.g., a mmWave frequency band) and a second reference signal on a low frequency band (e.g., a sub-6 GHz frequency band). In this case, the first reference signal, carried on the high frequency band, follows an LOS path 410c directly to the UE 204, while the second reference signal, carried on the low frequency band, follows an NLOS path 412c. Specifically, in this example, the second reference signal is partially reflected off of an object 430 (the portion of the signal penetrating the object 430 is not shown). As such, the second reference signal will arrive at the UE 204 after the first reference signal, having followed the NLOS path from the base station 402d to the UE 204.

This observation can be leveraged to discriminate between the LOS and NLOS path from a transmitter to a receiver, and therefore provide improved positioning performance (e.g., speed, accuracy, etc.). For example, a receiver capable of carrier aggregation (e.g., UE 204) can receive a reference RF signal from a transmitter (e.g., a base station or TRP) on a higher frequency and a second reference RF signal from the transmitter on a lower frequency, compare the ToAs of the received reference signals, and based on characteristics of the received reference signals (e.g., ToA, frequency, signal strength), determine which reference signal likely followed the LOS path between the transmitter and the receiver. The receiver can then use the ToA of that reference signal for positioning operations.

In an aspect, one radio (e.g., radio 310) of the receiver would be tuned to one frequency (e.g., the high frequency), and the other radio (e.g., radio 322) would be tuned to the other frequency (e.g., the low frequency). To compare the ToA of the reference signals received by the two radios, the radios should be synchronized to the same time (e.g., have aligned frame boundaries), or the relative offset between the radios should be known and the ToAs adjusted accordingly. Similarly, on the transmission side, the reference signals may be transmitted at the same time or may be transmitted with a known offset that can be used to adjust the ToA accordingly.

Figure 5:
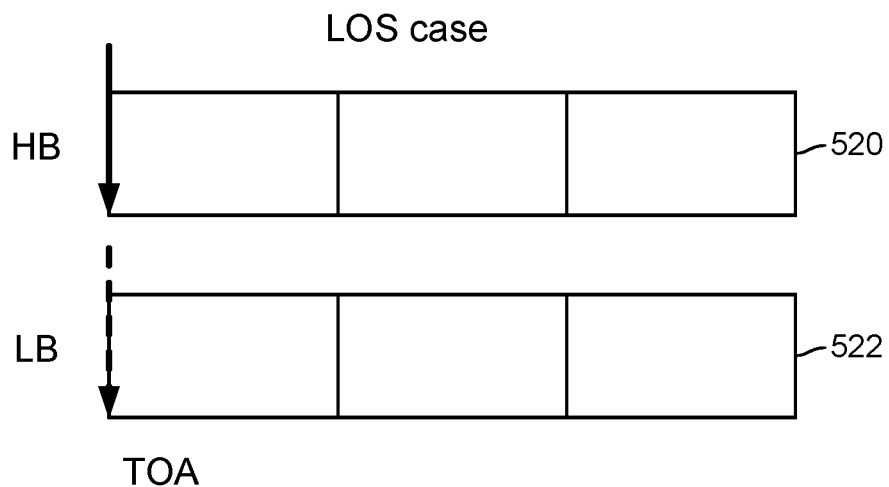
FIG. 5 illustrates an example of timing differences between LOS and NLOS paths, according to aspects of the disclosure.
Figure 5:
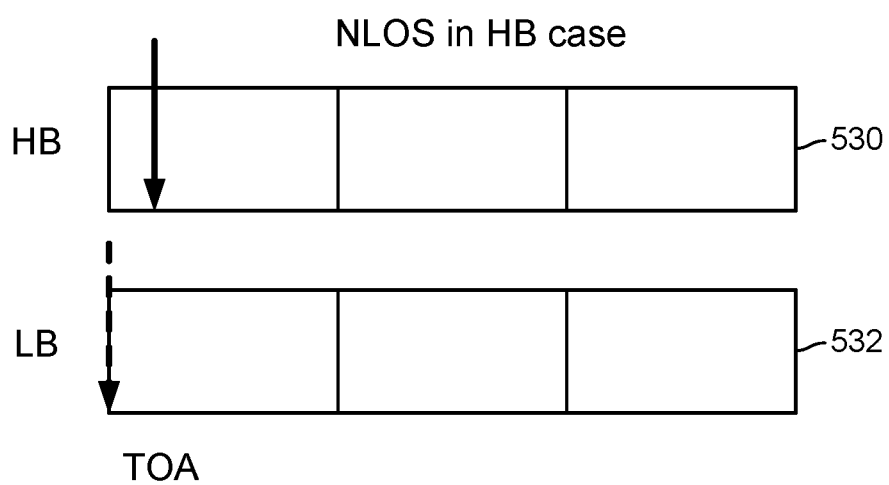

FIG. 5 illustrates an example of timing differences between LOS and NLOS paths, according to aspects of the disclosure. Frame sequences 520 and 522 illustrate the LOS case, where both the high frequency band (HB) reference signal and the low frequency band (LB) reference signal follow the LOS path between the transmitter (e.g., a base station 402) and the receiver (e.g., a UE 204), arriving at the receiver at the same time, and thereby having the same ToA.

Frame sequences 530 and 532 illustrate the NLOS case. In frame sequence 530, the high frequency band (HB) reference signal follows a NLOS path from the transmitter (e.g., a base station 402) to the receiver (e.g., a UE 204), arriving at the receiver after the start of the frame. In contrast, the low frequency band (LB) reference signal follows the LOS path between the transmitter (e.g., a base station 402) and the receiver (e.g., a UE 204), arriving at the receiver at the start of the frame. (Note that in the example of FIG. 5, the receiver sets the start of its frame time to the ToA of the LOS reference signal; however, this is not required.)

Generally, if the ToA of the high band reference signal is the same as the ToA for the low band reference signal, then the measured ToA has a high probability of being the ToA of the LOS path. In some situations, however, a strong reflection of the reference signal on both bands may be the only path detected at the receiver. Since both reference signals will have the same ToA, because they will both have followed the same NLOS path, this situation resembles the situation where they followed a truly LOS path in terms of the ToAs observed. This can be addressed by observing the signal strength of the received reference signals, as discussed further below.

Typically, because a low band reference signal can penetrate obstacles better than a high band reference signal, and is therefore more likely to follow the shortest path from the transmitter to the receiver, the ToA of the low band reference signal will often be earlier than, or at least the same as, the ToA of the high band reference signal. Thus, if the ToA of the high band reference signal is later than the ToA of the low band reference signal, the high band reference signal can be considered to have followed a NLOS path and be discarded for subsequent positioning operations. Note that in this case, although the low band reference signal may have followed a shorter path than the high band reference signal, it may or may not have followed a LOS path.

In an aspect, the reference signal received power (RSRP), reference signal received quality (RSRQ), and/or packet data protocol (PDP) measurements of the reference signals on both bands can provide further details for weighting the observations. For example, if the true LOS path is blocked and the receiver is only receiving reflections of the reference signals, then the high band and low band reference signals could have very different signal strengths, even though arriving at the same time. Specifically, since high band frequencies are more robust to reflections than low band frequencies, the high band reference signal will likely have a higher signal strength than the low band reference signal, as the majority of the low band reference signal's energy will have been absorbed by, or refracted at, the obstacle. Alternatively, if the true LOS path is not blocked but penetrates through an obstacle, then the high band will be attenuated more than the low band, and therefore the low band reference signal will likely have a higher signal strength than the high band reference signal. In either case, some knowledge of the transmit power or expected received signal strength would be beneficial, so that the receiver can compare the observed received signal strength to the expected signal strength. This information can be provided by the transmitter or observed over time by the receiver.

The techniques described above for distinguishing between the LOS and NLOS path from a transmitter to a receiver can be used to improve positioning performance (e.g., speed, accuracy, etc.). For example, for RTT procedures, the RTT between the transmitter and receiver may be measured separately on both frequency bands. That is, the receiver performs a first RTT procedure with the transmitter over the high frequency band and a second RTT procedure with the transmitter over the low frequency band. In an aspect, the receiver may perform the RTT procedures over the separate frequencies using different radios (e.g., using radio 310 and radio 322), or using the same radio but switching back and forth between the frequencies. In the former case, the separate radios should be synchronized to the same time, and in the latter case, that the receiver remains stationary during the consecutive RTT procedures. In both cases, the transmitter and receiver should be time-synchronized (e.g., their respective frame times should be aligned).

Once measured on both frequency bands, the receiver (or another network entity determining the location of the receiver, such as the serving base station or location server) can compare the propagation time ($T_{Prop}$) between the transmitter and the receiver for each frequency band. If the RTT for the high frequency band is the same as the RTT for the low frequency band, then the RTT path has a high probability of being a LOS path, the same as when the reference signals transmitted on the high and low frequency bands have the same ToA at the receiver. That RTT can then be used to determine the position of the receiver.

As noted above, if the RTT of the high frequency band is the same as the RTT for the low frequency band, then the measured RTT has a high probability of being the RTT of the LOS path. In some situations, however, a strong reflection of the reference signals on both bands may be the only path detected at the receiver. Since both RTTs will have the same length, because they will both have followed the same NLOS path, the receiver will think that they followed the LOS path. This can be addressed by observing the signal strength of the received reference signals, as discussed further below.

As noted above, low band reference signals penetrate obstacles better than high band reference signals, and are therefore more likely to follow the shortest path from the transmitter to the receiver. As such, the RTT of the low frequency band will often be less than, or at least the same as, the RTT of the high frequency band. Thus, if the RTT of the high frequency band is longer than the RTT of the low frequency band, the high frequency band RTT can be considered to have followed a NLOS path and be discarded for subsequent positioning operations. Note that in this case, although the low frequency band RTT may have followed a shorter path than the high frequency band RTT, it may or may not have followed a LOS path.

In an aspect, the RSRP, RSRQ, and/or PDP measurements of the reference signals used for the RTT procedures on the high and low frequency bands can provide further details for weighting the observations. For example, as discussed above, if the true LOS path is blocked and the receiver is only receiving reflections of the reference signals, then the high band and low band reference signals could have very different signal strengths, even though arriving at the same time. Specifically, since high band frequencies are more robust to reflections than low band frequencies, the high band reference signals will likely have a higher signal strength than the low band reference signals, as the majority of the low band reference signals' energy will have been absorbed by the obstacle. In this case, some knowledge of the transmit power or expected received signal strength would be beneficial, so that the receiver can compare the observed received signal strength to the expected signal strength. This information can be provided by the transmitter or observed over time by the receiver.

Figure 6:
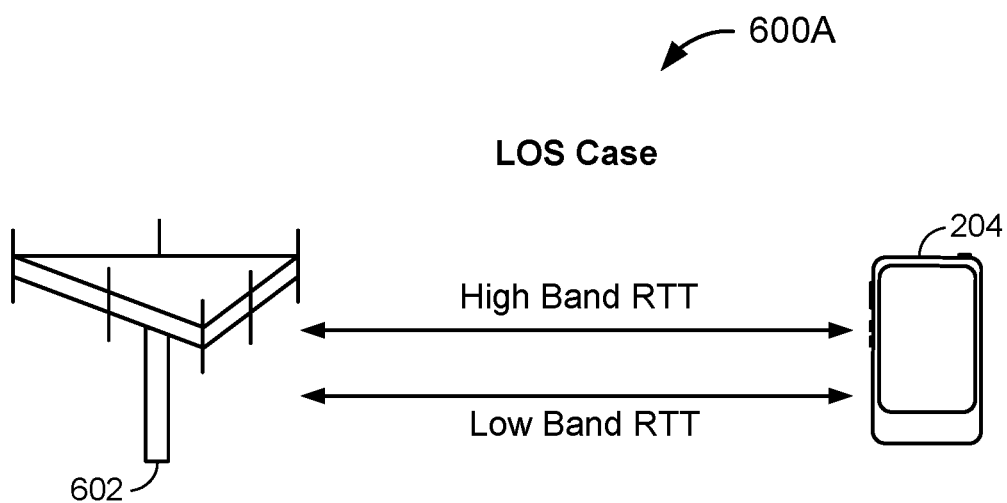
FIG. 6 illustrates an example of differences between LOS and NLOS round-trip-times (RTTs), according to aspects of the disclosure.
Figure 6:
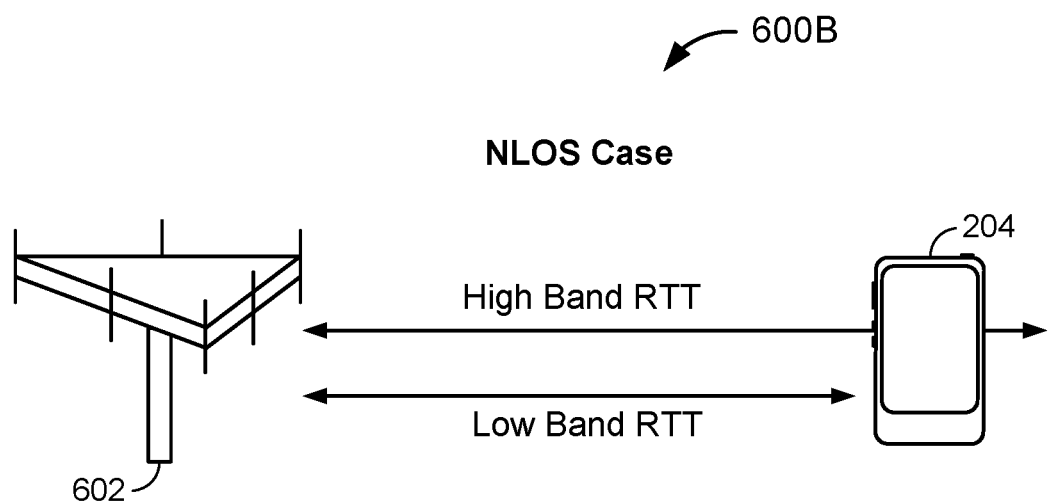

FIG. 6 illustrates an example of differences between LOS and NLOS RTTs, according to aspects of the disclosure. Example scenario 600A represents the LOS case, in which the high frequency band RTT and the low frequency band RTT between the transmitter (e.g., a base station or TRP) and the receiver (e.g., a UE 204) are the same, as illustrated by the equal length RTT lines. In contrast, in example scenario 600B, which is an NLOS case, the high frequency band RTT is longer than the low frequency band RTT, indicating that the high frequency band RTT followed an NLOS path. In that case, the high frequency band RTT would be discarded and the low frequency band RTT would be used to determine the position of the receiver.

The techniques described herein raise various implications for network signaling. For example, on the network side, frequency carriers (or the reference signals on the component carriers) should be tightly time synchronized for purposes of OTDOA positioning (where the receiver measures timing differences between pairs of network nodes). Ideally, the leading edge of a frame would have no offset (or a fixed offset with high precision) between network nodes. For RTT procedures, the carriers should be calibrated to equal precision. For uplink time difference of arrival (UT-DOA), the carriers should be tightly synchronized at the UE.

Regarding UE reporting requirements, OTDOA reports on both frequency bands would be assumed to have been measured with respect to the same clock (i.e., fully time synchronized). Thus, the OTDOA may be with respect to a reference signal on one of the frequency bands, represented as, for example, $OTDOA_{cellID,bandID} = TOA_{cellID,bandID} - TOA_{cell0,band0}$, Where "cell0" is the reference cell and "band0" is the reference frequency band. For RTT, the receiver, if not calculating its own position, should report the RTT across both bands. That is, the receiver reports the Rx-to-Tx per band, but may report both on a single band, for example, the low band. The reference signal in the RTT response is still needed in both bands. For UTDOA, the uplink reference signal for UTDOA across the frequency bands may have an associated Tx-to-Tx offset report.

Regarding the receiver (e.g., UE 204) capabilities needed, the ToA reports for both frequency bands should be associated with the same clock (or with some limit on timing accuracy between frequency bands) for OTDOA. In addition, the reference signals for UTDOA should have tight synchronization (or support an accurate report of any offsets).

Note that although the foregoing has generally referred to the receiver as a UE and the transmitter as a base station or TRP, the receiver may alternatively be a base station or TRP and the transmitter may alternatively be a UE, or both the receiver and transmitter may be base stations or TRPs, or both the receiver and transmitter may be UEs.

Figure 7:
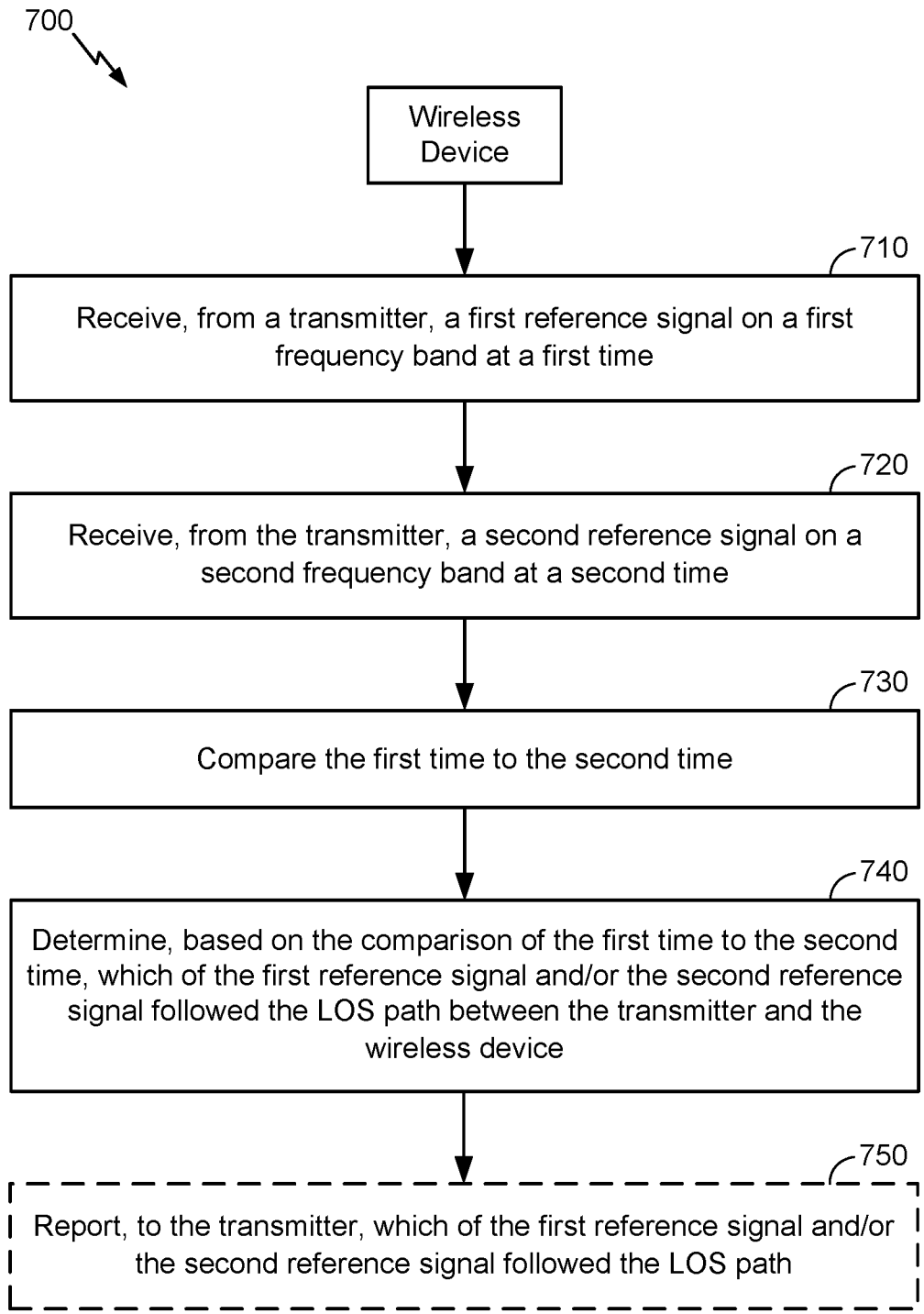
FIG. 7 illustrates a method of determining an LOS path between a transmitter and a wireless device in a wireless communications network, according to aspects of the disclosure.

FIG. 7 illustrates a method 700 of determining an LOS path between a transmitter (e.g., a UE 204, a base station, a TRP) and a wireless device (e.g., another UE 204, a base station, a TRP) in a wireless communications network, according to aspects of the disclosure. The method 700 may be performed by the wireless device.

At 710, the wireless device receives a first reference signal (e.g., PRS, NRS, TRS, CRS, DMRS, CSI-RS, etc.) on a first frequency band (e.g., a high frequency band in FR2) at a first time (e.g., a first ToA). In an aspect, operation 710 may be performed by antenna 302, receiver circuitry 340 (e.g., radio 310), processing system 360, and/or memory component 370, any or all of which may be considered means for performing this operation.

At 720, the wireless device receives a second reference signal on a second frequency band (e.g., a low frequency band in FR1) at a second time (e.g., a second ToA). In an aspect, operation 720 may be performed by antenna 304, receiver circuitry 340 (e.g., radio 322), processing system 360, and/or memory component 370, any or all of which may be considered means for performing this operation.

At 730, the wireless device compares the first time to the second time. In an aspect, operation 730 may be performed by modem 334, processing system 360, and/or memory component 370, any or all of which may be considered means for performing this operation.

At 740, the wireless device determines, at least based on the comparison of the first time to the second time, which of the first reference signal and/or the second reference signal followed the LOS path between the transmitter and the wireless device. In an aspect, operation 740 may be performed by modem 334, processing system 360, and/or memory component 370, any or all of which may be considered means for performing this operation.

At 750, the wireless device optionally reports, to a positioning entity (e.g., the serving base station or a location server) the transmitter, which of the first reference signal and/or the second reference signal followed the LOS path. Alternatively, the wireless device optionally reports, to the transmitter, a difference between the first time and the second time, a signal strength of the first reference signal, and a signal strength of the second reference signal. As yet another alternative, the wireless device optionally reports, to the transmitter, the first time, the second time, a signal strength of the first reference signal, and a signal strength of the second reference signal. In an aspect, operation 750 may be performed by antenna 302 or 304, transmitter circuitry 350, processing system 360, and/or memory component 370, any or all of which may be considered means for performing this operation.

Additionally, the method 700 may include (not shown) the wireless device estimating its own location based on a ToA of whichever of the first reference signal and/or the second reference signal followed the LOS path. For example, the wireless device may use the ToA to calculate the RTT between itself and the transmitter, and from the RTT, an estimate of the location of the wireless device (e.g., using RTTs between the wireless device and other transmitters or just the one RTT and angle of arrival (AoA) or angle of departure (AoD) information). Alternatively, the wireless device may report such measurements to a positioning entity, and the positioning entity may calculate the location of the wireless device.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method at a wireless device of determining a line-of-sight (LOS) path between a transmitter and the wireless device, comprising:
    sending, to the transmitter, an indication that the wireless device is capable of measuring a time of arrival of a reference signal on multiple frequency bands within a given accuracy;
    receiving, from the transmitter, a first reference signal on a first frequency band of the multiple frequency bands at a first time of arrival;
    receiving, from the transmitter, a second reference signal on a second frequency band of the multiple frequency bands at a second time of arrival, wherein the second frequency band is different from the first frequency band; and
    determining, at least based on a comparison of the first time of arrival to the second time of arrival, whether the first reference signal, the second reference signal, or both followed the LOS path between the transmitter and the wireless device.

2. The method of claim 1, further comprising:
    tuning, by a first radio of the wireless device, to the first frequency band to receive the first reference signal; and
    tuning, by a second radio of the wireless device, to the second frequency band to receive the second reference signal.

3. The method of claim 2, wherein the first radio and the second radio are synchronized in time with each other.

4. The method of claim 3, wherein the first radio and the second radio are synchronized in time with the transmitter.

5. The method of claim 1, further comprising:
    tuning, by a radio of the wireless device, to the first frequency band to receive the first reference signal; and
    tuning, by the radio of the wireless device, to the second frequency band to receive the second reference signal.

6. The method of claim 1, wherein the first frequency band comprises a high frequency band and the second frequency band comprises a low frequency band.

7. The method of claim 6, wherein the first time of arrival is after the second time of arrival.

8. The method of claim 7, further comprising:
    determining, based on the first time of arrival being after the second time of arrival, that the first reference signal did not follow the LOS path.

9. The method of claim 7, further comprising:
    determining, based on the first time of arrival being after the second time of arrival and a signal strength of the second reference signal being above a threshold, that the second reference signal followed the LOS path.

10. The method of claim 7, further comprising:
determining, based on the first time of arrival being after the second time of arrival and a signal strength of the second reference signal being below a threshold, that both the first reference signal and the second reference signal did not follow the LOS path.

11. The method of claim 6, wherein the first time of arrival is the same as the second time of arrival.

12. The method of claim 11, further comprising:
determining, based on the first time of arrival being the same as the second time of arrival, that both the first reference signal and the second reference signal followed the LOS path.

13. The method of claim 11, further comprising:
determining, based on the first time of arrival being the same as the second time of arrival and a signal strength of the second reference signal being higher than a signal strength of the first reference signal, that both the first reference signal and the second reference signal followed the LOS path through an obstacle.

14. The method of claim 11, further comprising:
determining, based on the first time of arrival being the same as the second time of arrival and a signal strength of the second reference signal being below a threshold, that both the first reference signal and the second reference signal did not follow the LOS path.

15. The method of claim 1, further comprising:
reporting, to the transmitter, which of the first reference signal and/or the second reference signal followed the LOS path.

16. The method of claim 15, wherein a time of arrival of whichever of the first reference signal and/or the second reference signal followed the LOS path is used by a positioning entity in a round-trip-time positioning procedure.

17. The method of claim 1, further comprising:
estimating a location of the wireless device based on a time of arrival of whichever of the first reference signal and/or the second reference signal followed the LOS path.

18. The method of claim 1, further comprising:
reporting, to the transmitter, the first time of arrival, the second time of arrival, a signal strength of the first reference signal, and a signal strength of the second reference signal.

19. The method of claim 1, further comprising:
reporting, to the transmitter, a difference between the first time of arrival and the second time of arrival, a signal strength of the first reference signal, and a signal strength of the second reference signal.

20. The method of claim 1, wherein:
the wireless device comprises a user equipment and the transmitter comprises a base station or transmission-reception point (TRP), or
the wireless device comprises a first base station or TRP and the transmitter comprises a second base station or TRP, or
the wireless device comprises a base station or TRP and the transmitter comprises a user equipment, or
the wireless device comprises a user equipment and the transmitter comprises a user equipment.

21. The method of claim 1, wherein the first and second reference signals are transmitted at the same time or with a known offset to be used to adjust the first time of arrival, the second time of arrival, or both.

22. The method of claim 21, further comprising:
receiving an indication of the known offset from the transmitter.

23. A wireless device, comprising:
a memory;
at least one transceiver; and
at least one processor communicatively coupled to the memory and the at least one transceiver, wherein the at least one processor is configured to:
send, to a transmitter via the at least one transceiver, an indication that the wireless device is capable of measuring a time of arrival of a reference signal on multiple frequency bands within a given accuracy;
receive, from the transmitter via the at least one transceiver, a first reference signal on a first frequency band of the multiple frequency bands at a first time of arrival;
receive, from the transmitter via the at least one transceiver, a second reference signal on a second frequency band of the multiple frequency bands at a second time of arrival, wherein the second frequency band is different from the first frequency band; and
determine, at least based on a comparison of the first time of arrival to the second time of arrival, whether the first reference signal, the second reference signal, or both followed a line of site (LOS) path between the transmitter and the wireless device.

24. The wireless device of claim 23, further comprising:
a first radio of the at least one transceiver configured to tune to the first frequency band to receive the first reference signal; and
a second radio of the at least one transceiver configured to tune to the second frequency band to receive the second reference signal.

25. The wireless device of claim 24, wherein the first radio and the second radio are synchronized in time with each other.

26. The wireless device of claim 25, wherein the first radio and the second radio are synchronized in time with the transmitter.

27. The wireless device of claim 23, further comprising:
a radio of the at least one transceiver configured to tune to the first frequency band to receive the first reference signal, and configured to tune to the second frequency band to receive the second reference signal.

28. The wireless device of claim 23, wherein the first frequency band comprises a high frequency band and the second frequency band comprises a low frequency band.

29. The wireless device of claim 28, wherein the first time of arrival is after the second time of arrival.

30. The wireless device of claim 29, wherein, based on the first time of arrival being after the second time of arrival, the at least one processor is configured to determine that the first reference signal did not follow the LOS path.

31. The wireless device of claim 29, wherein, based on the first time of arrival being after the second time of arrival and a signal strength of the second reference signal being above a threshold, the at least one processor is configured to determine that the second reference signal followed the LOS path.

32. The wireless device of claim 29, wherein, based on the first time of arrival being after the second time of arrival and a signal strength of the second reference signal being below a threshold, the at least one processor is configured to determine that both the first reference signal and the second reference signal did not follow the LOS path.

33. The wireless device of claim 28, wherein the first time of arrival is the same as the second time of arrival.

34. The wireless device of claim 33, wherein, based on the first time of arrival being the same as the second time of arrival, the at least one processor is configured to determine that both the first reference signal and the second reference signal followed the LOS path.

35. The wireless device of claim 33, wherein, based on the first time of arrival being the same as the second time of arrival and a signal strength of the second reference signal being higher than a signal strength of the first reference signal, the at least one processor is configured to determine that both the first reference signal and the second reference signal followed the LOS path through an obstacle.

36. The wireless device of claim 33, wherein, based on the first time of arrival being the same as the second time of arrival and a signal strength of the second reference signal being below a threshold, the at least one processor is configured to determine that both the first reference signal and the second reference signal did not follow the LOS path.

37. The wireless device of claim 23, wherein the at least one processor is further configured to:
cause the at least one transceiver to report, to the transmitter, which of the first reference signal and/or the second reference signal followed the LOS path.

38. The wireless device of claim 37, wherein a time of arrival of whichever of the first reference signal and/or the second reference signal followed the LOS path is used by a positioning entity in a round-trip-time positioning procedure.

39. The wireless device of claim 23, wherein the at least one processor is further configured to:
estimate a location of the wireless device based on a time of arrival of whichever of the first reference signal and/or the second reference signal followed the LOS path.

40. The wireless device of claim 23, wherein the at least one processor is further configured to:
cause the at least one transceiver to report, to the transmitter, the first time of arrival, the second time of arrival, a signal strength of the first reference signal, and a signal strength of the second reference signal.

41. The wireless device of claim 23, wherein the at least one processor is further configured to:
cause the at least one transceiver to report, to the transmitter, a difference between the first time of arrival and the second time of arrival, a signal strength of the first reference signal, and a signal strength of the second reference signal.

42. The wireless device of claim 23, wherein:
the wireless device comprises a user equipment and the transmitter comprises a base station or transmission-reception point (TRP), or
the wireless device comprises a first base station or TRP and the transmitter comprises a second base station or TRP, or
the wireless device comprises a base station or TRP and the transmitter comprises a user equipment, or
the wireless device comprises a user equipment and the transmitter comprises a user equipment.

43. The wireless device of claim 23, wherein the first and second reference signals are transmitted at the same time or with a known offset to be used to adjust the first time of arrival, the second time of arrival, or both.

44. The wireless device of claim 23, wherein the at least one processor is further configured to:
receive, via the at least one transceiver, an indication of the known offset from the transmitter.

45. A wireless device, comprising:
means for sending, to a transmitter, an indication that the wireless device is capable of measuring a time of arrival of a reference signal on multiple frequency bands within a given accuracy;
means for receiving, from the transmitter, a first reference signal on a first frequency band of the multiple frequency bands at a first time of arrival;
means for receiving, from the transmitter, a second reference signal on a second frequency band of the multiple frequency bands at a second time of arrival, wherein the second frequency band is different from the first frequency band; and
means for determining, at least based on a comparison of the first time of arrival to the second time of arrival, whether the first reference signal, the second reference signal, or both followed the LOS path between the transmitter and the wireless device.

46. A non-transitory computer-readable medium storing computer-executable instructions, the computer-executable instructions comprising:
at least one instruction instructing a wireless device to send, to a transmitter, an indication that the wireless device is capable of measuring a time of arrival of a reference signal on multiple frequency bands within a given accuracy;
at least one instruction instructing the wireless device to receive, from the transmitter, a first reference signal on a first frequency band of the multiple frequency bands at a first of arrival;
at least one instruction instructing the wireless device to receive, from the transmitter, a second reference signal on a second frequency band of the multiple frequency bands at a second time of arrival, wherein the second frequency band is different from the first frequency band; and
at least one instruction instructing the wireless device to determine, at least based on a comparison of the first time of arrival to the second time of arrival, whether the first reference signal, the second reference signal, or both followed the LOS path between the transmitter and the wireless device.

* * * * *